(12) United States Patent
Fukuda (10) Patent No.: US 7,467,567 B2
(45) Date of Patent: Dec. 23, 2008

(54) GEAR REDUCTION APPARATUS FOR A BICYCLE COMPONENT

(75) Inventor: Masahiko Fukuda, Amagasaki (JP)

(73) Assignee: Shimano, Inc., Sakai, Osaka (JP)

( * ) Notice: Subject to any disclaimer, the term of this patent is extended or adjusted under 35 U.S.C. 154(b) by 758 days.

(21) Appl. No.: 10/708,325

(22) Filed: Feb. 24, 2004

(65) Prior Publication Data

US 2005/0187048 A1    Aug. 25, 2005

(51) Int. Cl.
*F16H 1/02*    (2006.01)
(52) U.S. Cl. .......................... 74/412 R; 474/82; 474/80
(58) Field of Classification Search ................ 474/82, 474/80, 78, 70; 280/236, 259, 260; 74/412 R
See application file for complete search history.

(56) References Cited

U.S. PATENT DOCUMENTS

| | | |
|---|---|---|
| 3,863,512 A | 2/1975 | Crawley |
| 3,919,891 A | 11/1975 | Stuhlmuller et al. |
| 4,041,788 A | 8/1977 | Niniger, Jr. |
| 4,605,240 A | 8/1986 | Clem et al. |
| 4,946,425 A | 8/1990 | Bühlmann |
| 5,213,548 A | 5/1993 | Colbert et al. |
| 5,328,414 A | 7/1994 | Ancarani Restelli |
| 5,357,177 A | 10/1994 | Fey et al. |
| 5,358,451 A | 10/1994 | Lacombe et al. |
| 5,470,277 A | 11/1995 | Romano |
| 5,480,356 A | 1/1996 | Campagnolo |
| 5,483,137 A | 1/1996 | Fey et al. |
| 5,569,104 A | 10/1996 | Bellio et al. |
| 5,873,283 A | 2/1999 | Chen et al. |
| 6,023,646 A | 2/2000 | Kubacsi et al. |
| 6,162,140 A | 12/2000 | Fukuda |
| 6,293,882 B1 | 9/2001 | Kitamura et al. |
| 6,623,389 B1 * | 9/2003 | Campagnolo ................ 474/70 |
| 6,945,888 B2 * | 9/2005 | Fukuda et al. ................ 474/70 |
| 6,997,835 B2 * | 2/2006 | Fukuda ........................ 474/82 |
| 2006/0100045 A1 * | 5/2006 | Fukuda ........................ 474/70 |

FOREIGN PATENT DOCUMENTS

| | | |
|---|---|---|
| DE | 4231761 A1 | 3/1994 |
| DE | 4340471 C1 | 2/1995 |

(Continued)

OTHER PUBLICATIONS

European search report for EP 04026864.1, the European application that corresponds to this application, dated Oct. 30, 2007.

Primary Examiner—David M Fenstermacher
(74) Attorney, Agent, or Firm—James A. Deland (57) ABSTRACT

A gear reduction apparatus for a bicycle component comprises a gear support, a first gear coupled to the gear support for receiving rotational drive force from a drive component, and a second gear coupled to the gear support for communicating rotational drive force to a driven portion of the bicycle component. The first gear is operatively coupled to the second gear to communicate rotational drive force from the drive component to the driven portion of the bicycle component, and the first gear, the second gear and the gear support are coupled together so that the first gear, the second gear and the gear support may be coupled to and removed from the drive component and the driven portion of the bicycle component as a self-contained unit.

21 Claims, 10 Drawing Sheets

FOREIGN PATENT DOCUMENTS

| | | |
|---|---|---|
| EP | 529664 A2 | 3/1993 |
| EP | 1010612 A1 | 6/2000 |
| EP | 1281611 A2 | 2/2003 |
| FR | 2587079 A1 | 3/1987 |
| FR | 2605969 A1 | 5/1988 |
| JP | 54-38041 | 3/1979 |
| JP | 59-96086 A | 6/1984 |
| JP | 5-319357 A | 12/1993 |
| JP | 6-48368 A | 2/1994 |
| JP | 8-104282 A | 4/1996 |
| WO | 00/43259 A1 | 7/2000 |

* cited by examiner

GEAR REDUCTION APPARATUS FOR A BICYCLE COMPONENT

BACKGROUND OF INVENTION

The present invention is directed to bicycles and, more particularly, to a motorized bicycle component.

Many current bicycles have electronically controlled bicycle components. For example, some bicycles include automatic transmissions wherein electronically motorized front and rear derailleurs are automatically controlled by a microcomputer based on bicycle speed. One type of motorized derailleur includes a motor that is spaced apart from the derailleur and connected to the derailleur by a conventional Bowden cable, wherein the motor pulls and releases the inner wire of the Bowden cable to operate the derailleur. Another type of motorized derailleur integrates the motor with the derailleur so that the motor drive shaft directly moves the derailleur linkage mechanism. Such a configuration eliminates the requirement of a Bowden cable, thus making the overall derailleur mechanism more compact.

While a derailleur with an integrated motor has many advantages, it also has drawbacks. For example, the derailleur itself must be made larger to accommodate the motor and related components. Since the derailleur is mounted to the side of the bicycle frame, the larger derailleur protrudes laterally more than a conventional derailleur. This, in turn, creates the risk that the derailleur may be struck by rocks or other obstacles when riding in rough terrain, or that the derailleur is damaged or destroyed if the bicycle falls over.

Some motorized derailleurs include gear reduction mechanisms comprising a plurality of variably sized interconnected gears so that higher speed, low torque motors may be used to precisely move the derailleur linkage mechanism. If the motor is integrated with the derailleur, then the gear reduction mechanism also must be integrated with the derailleur. Typically, the gear reduction mechanism is incorporated within the derailleur base member that mounts the derailleur to the bicycle frame. In such cases, the pivot shafts for the variably sized gears are attached to the base member, and possibly to the derailleur linkage mechanism and/or to the motor drive shaft. As a result, the entire derailleur sometimes must be disassembled in order to service the motor or the gear reduction mechanism. Furthermore, sometimes the pivot shafts are permanently mounted to the base member, to the linkage mechanism and/or to the motor drive shaft such that the entire derailleur must be replaced if the gear reduction mechanism is worn or damaged.

SUMMARY OF INVENTION

The present invention is directed to various features of a motorized bicycle component. In one embodiment, a gear reduction apparatus for a bicycle component comprises a gear support, a first gear coupled to the gear support for receiving rotational drive force from a drive component, and a second gear coupled to the gear support for communicating rotational drive force to a driven portion of the bicycle component. The first gear is operatively coupled to the second gear to communicate rotational drive force from the drive component to the driven portion of the bicycle component, and the first gear, the second gear and the gear support are coupled together so that the first gear, the second gear and the gear support may be coupled to and removed from the drive component and the driven portion of the bicycle component as a self-contained unit. Additional inventive features will become apparent from the description below, and such features alone or in combination with the above features may form the basis of further inventions as recited in the claims and their equivalents.

DETAILED DESCRIPTION

Figure 1:
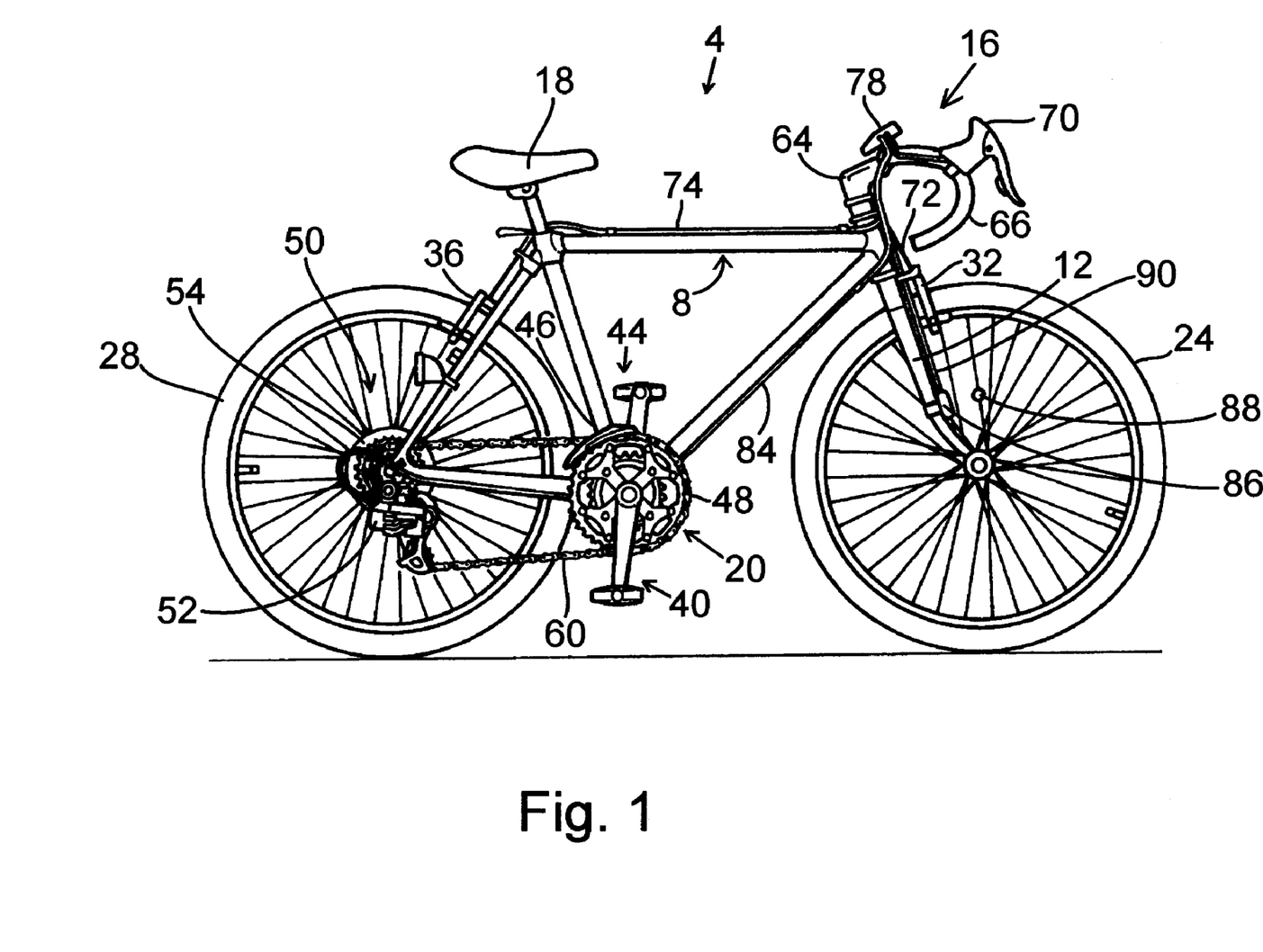
FIG. 1 is a side view of a particular embodiment of a bicycle.

FIG. 1 is a side view of a particular embodiment of a bicycle 4. Bicycle 4 comprises a frame body 8 constructed by welding tubing together in a conventional double diamond configuration. A front fork 12 is mounted to the front of frame body 8 for rotation around an inclined axis, and a handlebar assembly 16 is mounted to the top of front fork 12. A saddle 18 is mounted to the upper middle part of frame body 8, a drive mechanism 20 is mounted to the lower part of frame body 8, a front wheel 24 is rotatably mounted to the bottom of front fork 12, and a rear wheel 28 is rotatably mounted to the rear of frame body 8. A front brake mechanism 32 is used to brake front wheel 24, and a rear brake mechanism 36 is used to brake rear wheel 28.

Drive mechanism 20 comprises a pedal crank assembly 40 rotatably mounted at the bottom bracket of frame body 8, a front transmission 44 including a front derailleur 46 mounted to frame body 8 and a plurality of (e.g., two) sprockets 48 is mounted to the right side of pedal crank assembly 40, and a rear transmission 50 including a rear derailleur 52 mounted to the rear of frame body 8 and a plurality of (e.g., eight) rear sprockets 54 mounted to rear wheel 28. Front derailleur 46 selectively engages a chain 60 on one of the plurality of front sprockets 48, and rear derailleur 52 selectively engages chain 60 on one of the plurality of rear sprockets 54.

Handlebar assembly 16 comprises a handle stem 64 mounted to the top of front fork 12 and a drop-style handlebar 66 mounted to the top of handle stem 64. Combined brake/shift lever assemblies 70 (only the right side brake/shift lever assembly is shown) of known construction are mounted at the opposite upper curves sides of handlebar 66. The left side brake/shift lever assembly 70 is used to operate front brake mechanism 32 through a brake cable assembly 72, and the right side brake/shift lever assembly 70 is used to operate rear brake mechanism 36 through a brake cable assembly 74. The brake/shift lever assemblies 70 also are structured to manually control front transmission 44 and rear transmission 50 through a control unit 78 that is centrally mounted to handlebar 66. Control unit 78 automatically electronically controls the operation of front derailleur 46 and rear derailleur 52 through an electrical cable assembly 84 in a known manner in response to signals from a wheel rotation sensor comprising a reed switch 86 mounted to frame body 8 and a magnet 88 mounted to front wheel 24, wherein the signals from reed switch 86 are received through an electrical cable assembly 90. Alternatively, control unit 78 electronically controls the operation of front derailleur 46 and rear derailleur 52 in a known manner in response to the manual operation of the combined brake/shift lever assemblies 70.

Figures 2, 3:
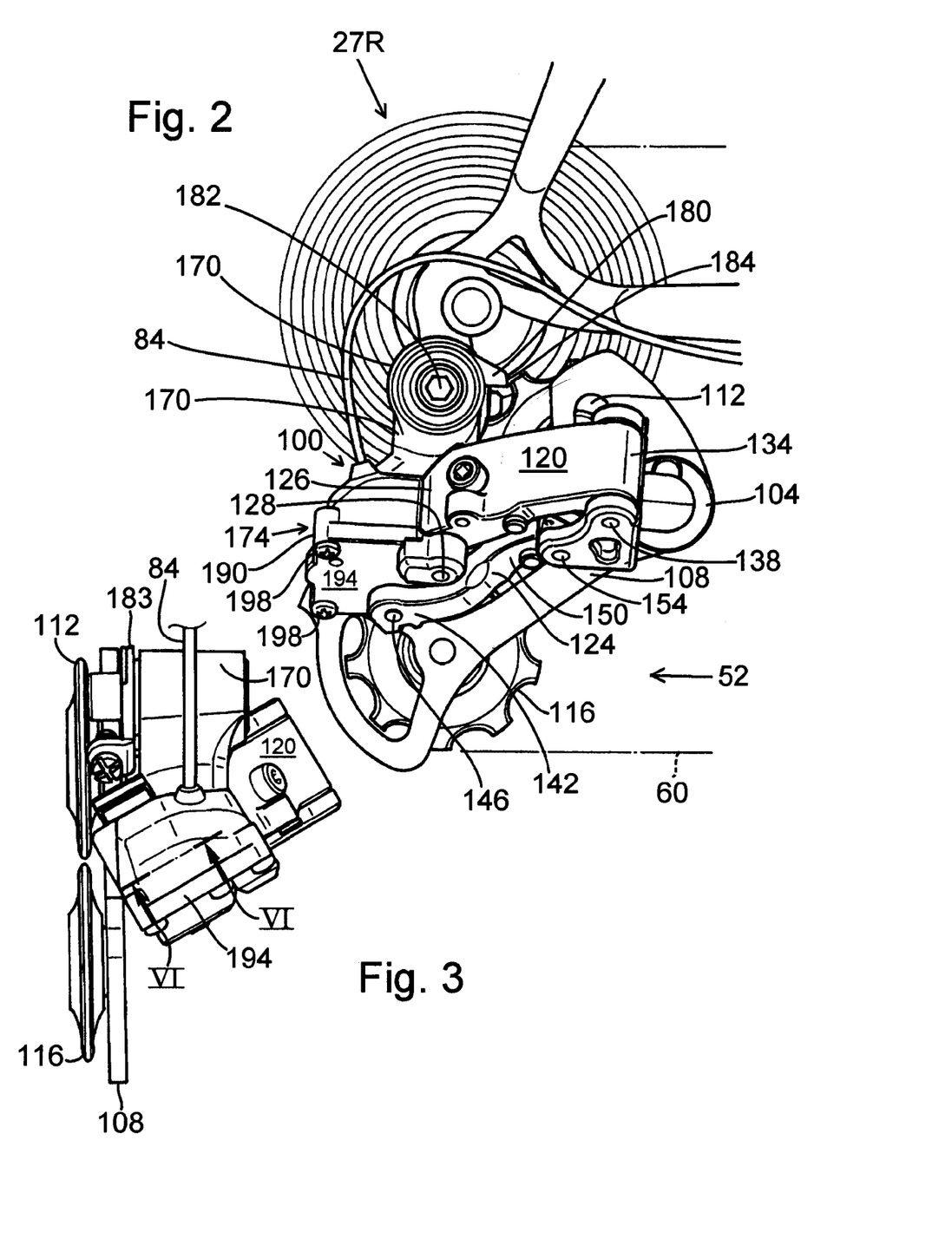
FIG. 2 is a more detailed side view of the rear derailleur.
FIG. 3 is a rear view of the rear derailleur.
Figure 4:
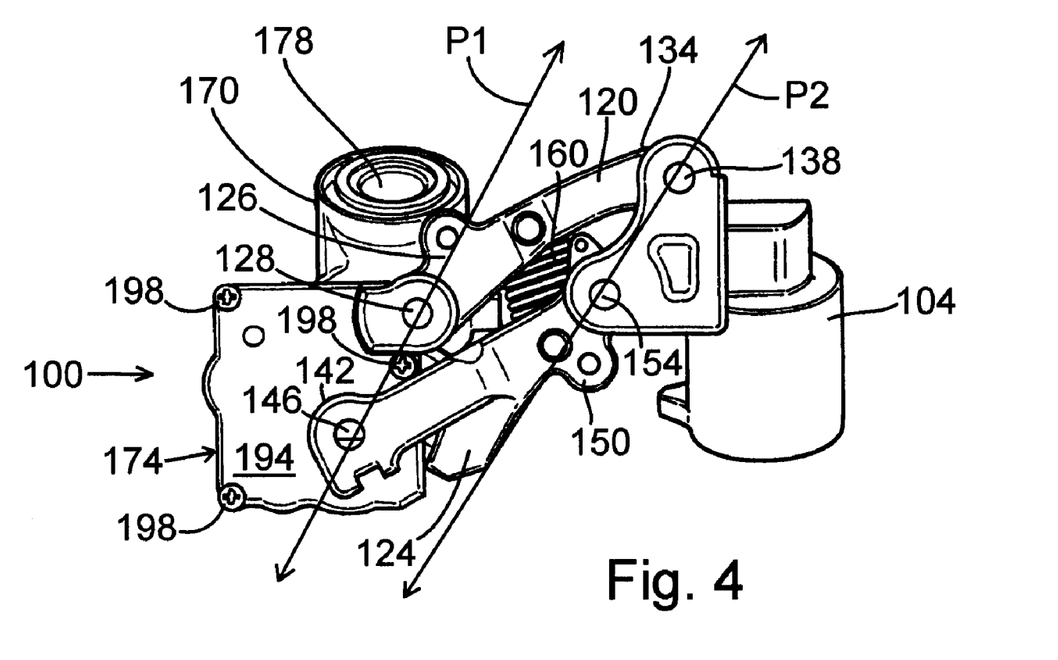
FIG. 4 is a bottom view of the rear derailleur in a high speed position.
Figure 5:
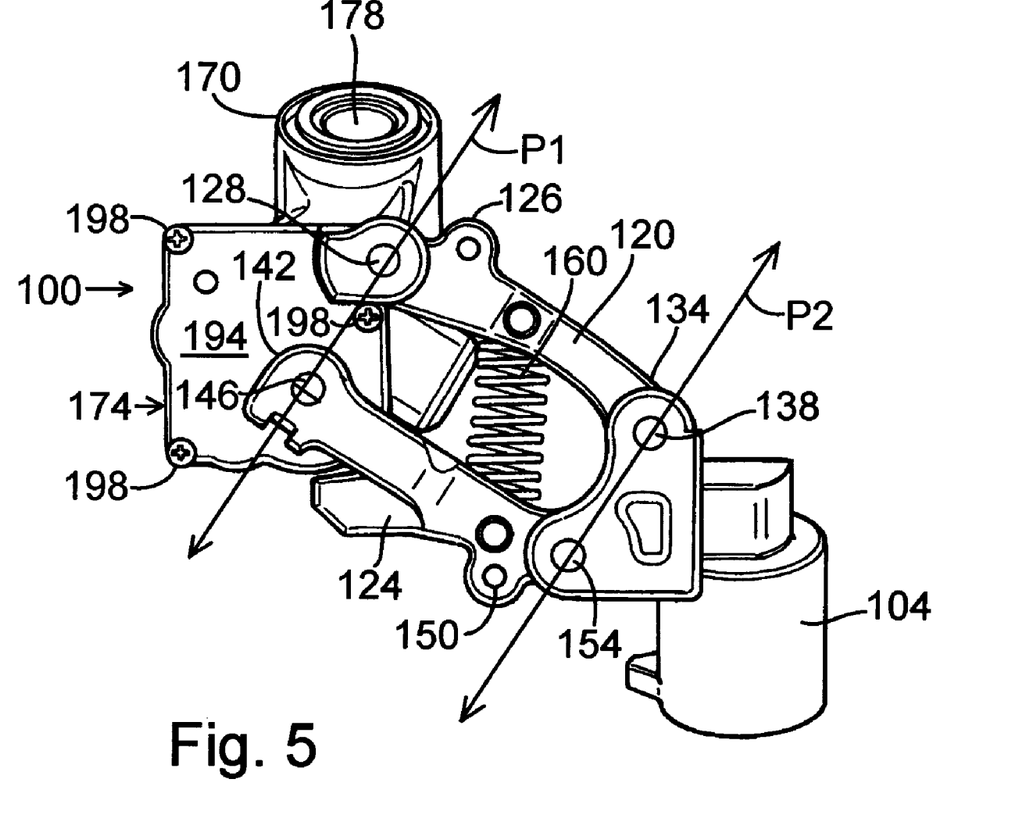
FIG. 5 is a bottom view of the rear derailleur in a low speed position.

FIG. 2 is a side view of rear derailleur 52, FIG. 3 is a rear view of rear derailleur 52, FIG. 4 is a bottom view of rear derailleur 52 in a high speed position (when chain 60 engages the smallest rear sprocket 54), and FIG. 5 is a bottom view of rear derailleur 52 in a low speed position (when chain 60 engages the largest rear sprocket 54). As shown in those Figures, rear derailleur 52 comprises a base member 100 structured to attach rear derailleur 52 to the rear of frame body 8, a movable member 104 pivotably supporting a chain guide 108, and first and second link members 120 and 124 coupled between base member 100 and movable member 104 so that movable member 104 moves relative to base member 100. Chain guide 108 rotatably supports a guide pulley 112 and a tension pulley 116 for guiding chain 60 to engage selected ones of the plurality of rear sprockets 54.

Figure 6:
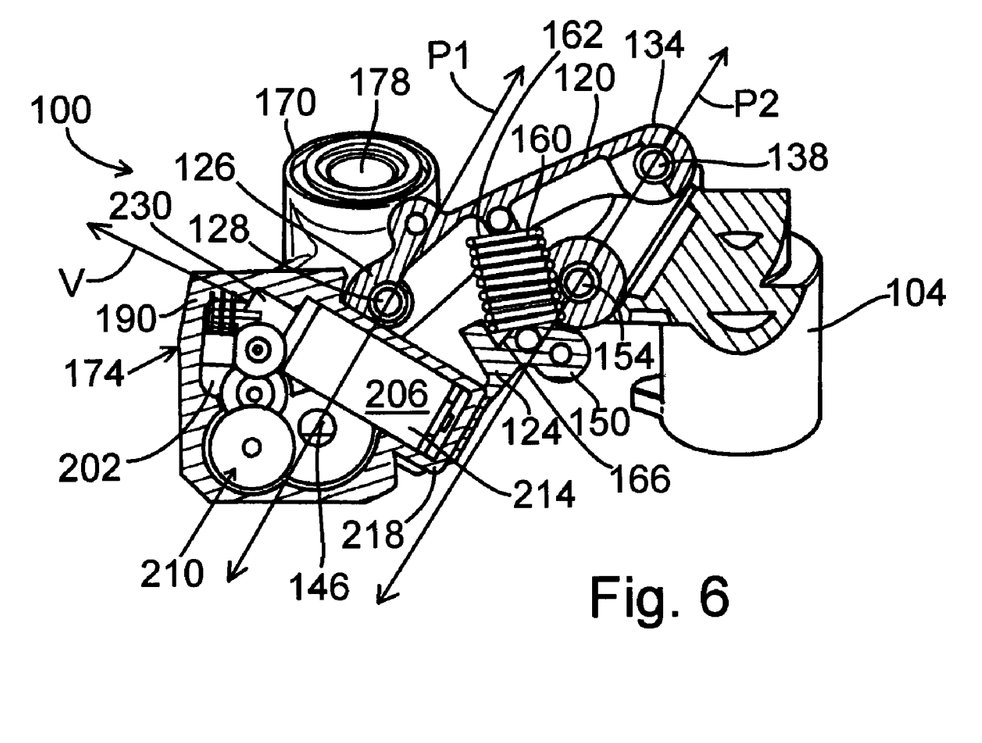
FIG. 6 is a cross sectional view of the rear derailleur taken along line VI-VI in FIG. 3.
Figure 7:
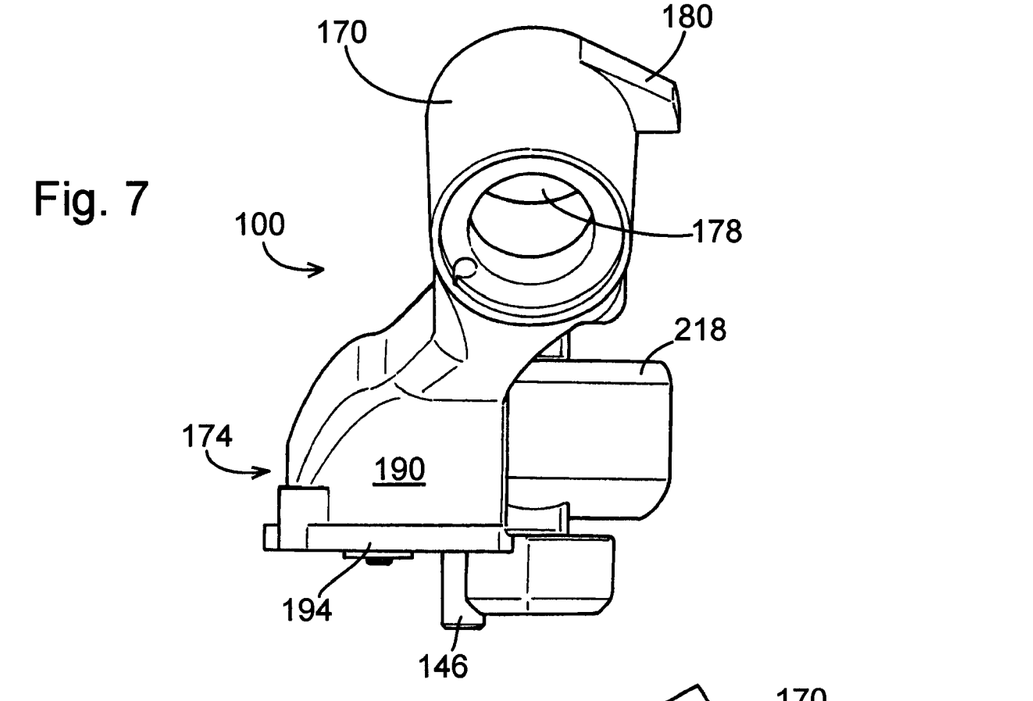
FIG. 7 is an upper view of the derailleur base member.
Figure 8:
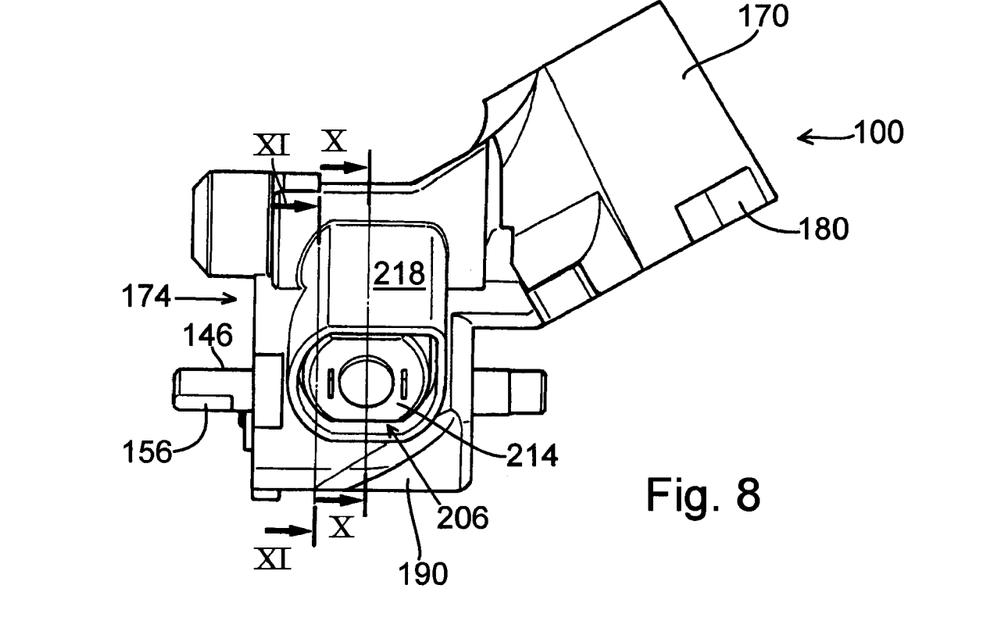
FIG. 8 is a front view of the derailleur base member.

First link member 120 has a first end 126 and a second end 134, wherein first end 126 is pivotably coupled to base member 100 through a first link pin 128, and second end 134 is pivotably coupled to movable member 104 through a second link pin 138. Similarly, second link member 124 has a first end 142 and a second end 150, wherein first end 142 is pivotably coupled to base member 100 through a third link pin 146, and second end 150 is pivotably coupled to movable member 104 through a fourth link pin 154. In this embodiment, first end 142 of second link member 124 is keyed to third link pin 146 by a flat 156 (FIG. 8) formed on third link pin 146 so that second link member 124 and third link pin 146 rotate as a unit. A spring 160 (FIG. 6) is disposed between first link member 120 and second link member 124 to remove the play in a gear reduction mechanism 210. In this embodiment, spring 160 is a coil spring with a first end 162 and a second end 166, wherein first end 162 exerts a biasing force against first link member 120 approximately midway between first link pin 128 and second link pin 138, and second end 166 exerts a biasing force against second link member 124 in close proximity to fourth link pin 154.

Base member 100 comprises a generally cylindrical frame mounting portion 170 and a drive housing 174. Frame mounting portion 170 includes a mounting bolt opening 178 and a rotation stopper 180. A frame mounting bolt 182 passes through mounting bolt opening 178 for rotatably mounting frame mounting portion 170 to frame body 2. A conventional bias spring (not shown) is disposed within mounting bolt opening 178 and surrounds frame mounting bolt 182 for biasing a stopper plate 183 (FIG. 3) relative to frame mounting portion 170 so that a rotation stopper 184 (FIG. 2) on stopper plate 183 abuts against rotation stopper 180 on frame mounting portion 170 in a known manner.

Drive housing 174 comprises a main housing 190 and a cover 194 attached to main housing 190 through screws 198. Preferably, cover 194 is attached to a bottom of main housing 190 such that water or other contaminants cannot enter into the inside of main housing 190. Main housing 190 is integrally formed as one piece with frame mounting portion 170 and defines a drive component space 202 (FIG. 6) for housing a drive component such as an electric motor 206 and gear reduction mechanism 210.

Figures 10, 11:
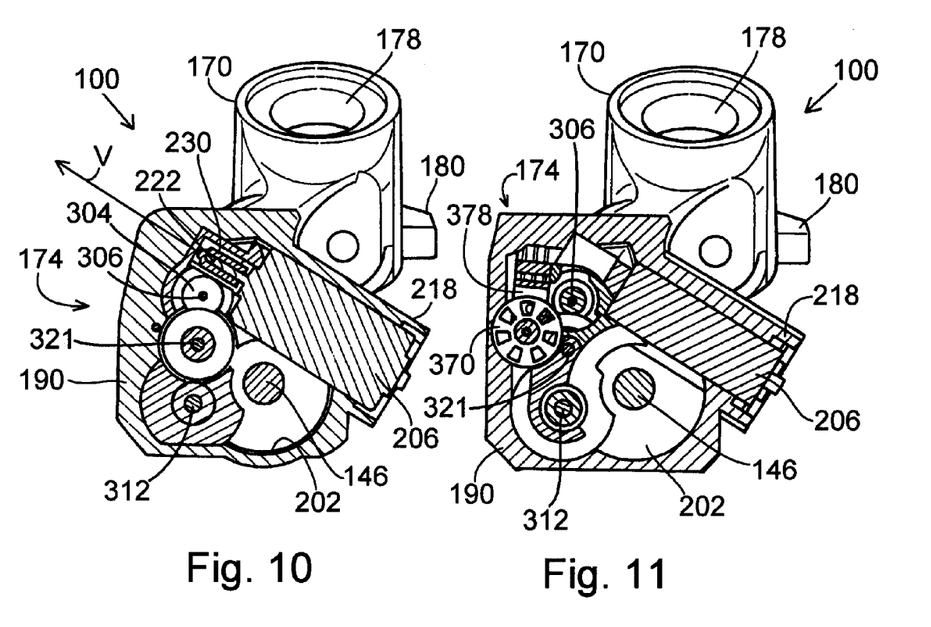
FIG. 10 is a cross sectional view of the derailleur base member taken along line X-X in FIG. 8.
FIG. 11 is a cross sectional view of the derailleur base member taken along line XI-XI in FIG. 8.

Motor 206 comprises a primary motor housing 214 (FIG. 8) disposed within a generally cylindrical motor mounting portion 218 of main housing 190, a motor drive shaft 222 (FIG. 10) extending outwardly from primary motor housing 214 and defining a drive shaft vector V that points away from primary motor housing 214, and a motor shaft drive gear 230 attached to the free end of motor drive shaft 222. In this embodiment, drive housing 174 is structured such that the entire primary motor housing 214 is disposed within base member 100.

Figure 12:
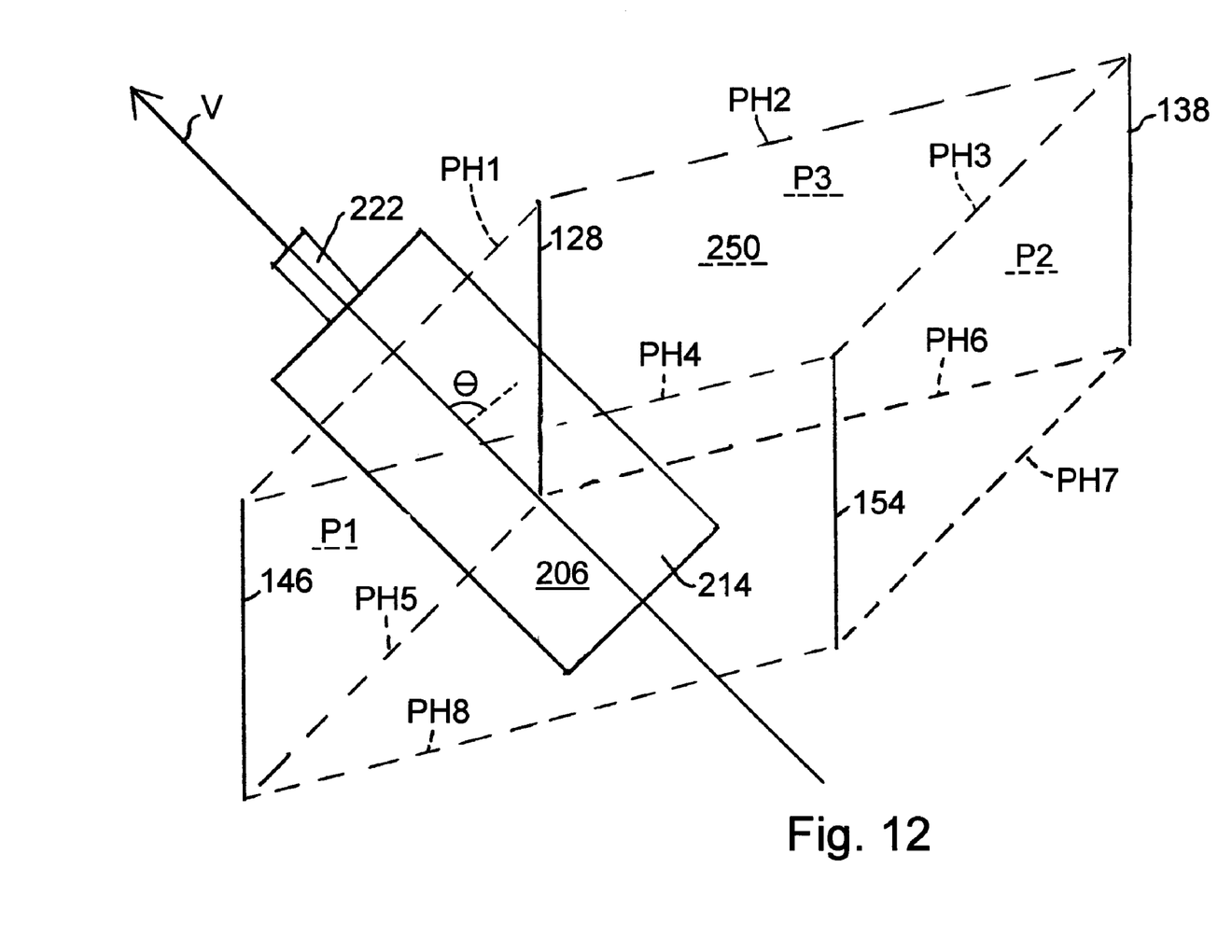
FIG. 12 is a schematic view of the derailleur motor disposed in a phantom space defined by the link pins.

As shown schematically in FIG. 12, first link pin 128, second link pin 138, third link pin 146 and fourth link pin 154 define edges of a phantom space 250, and straight continuous phantom lines PH1-PH8 connecting ends of first link pin 128, second link pin 138, third link pin 146 and fourth link pin 154 in a non-crossing manner define remaining edges of phantom space 250. Furthermore, first link pin 128 and third link pin 146 lie in a plane P1, and second link pin 138 and fourth link pin 154 lie in a plane P2. Drive shaft vector V points away from plane P2, preferably but not necessarily such that a relative angle θ between drive shaft vector V and plane P2 is in a range between 45 degrees and 135 degrees when measured in a plane P3 that is perpendicular to first link pin 128, second link pin 138, third link pin 146 and fourth link pin 154. At least a part of primary motor housing 214 is disposed within phantom space 250. As a result of these features, alone or in combination, base member 100, and hence rear derailleur 52, may be made more compact.

Figure 9:
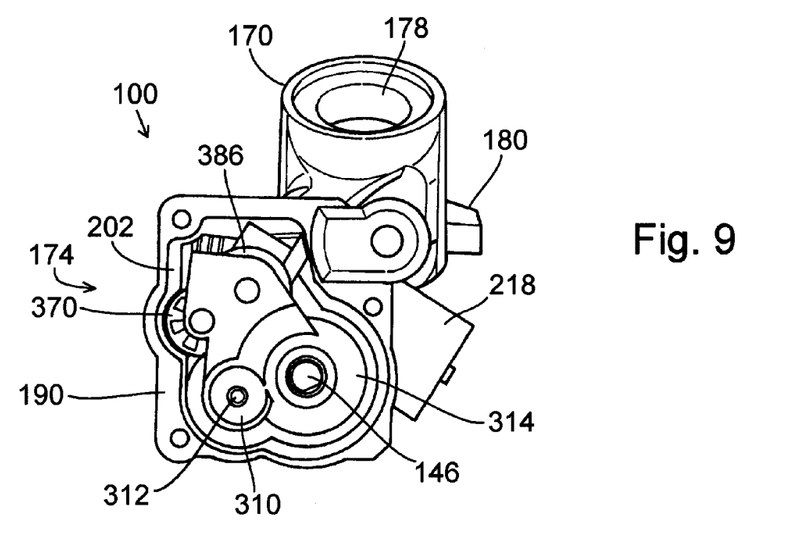
FIG. 9 is a bottom view of the derailleur base member with the gear reduction mechanism cover removed.
Figure 13:
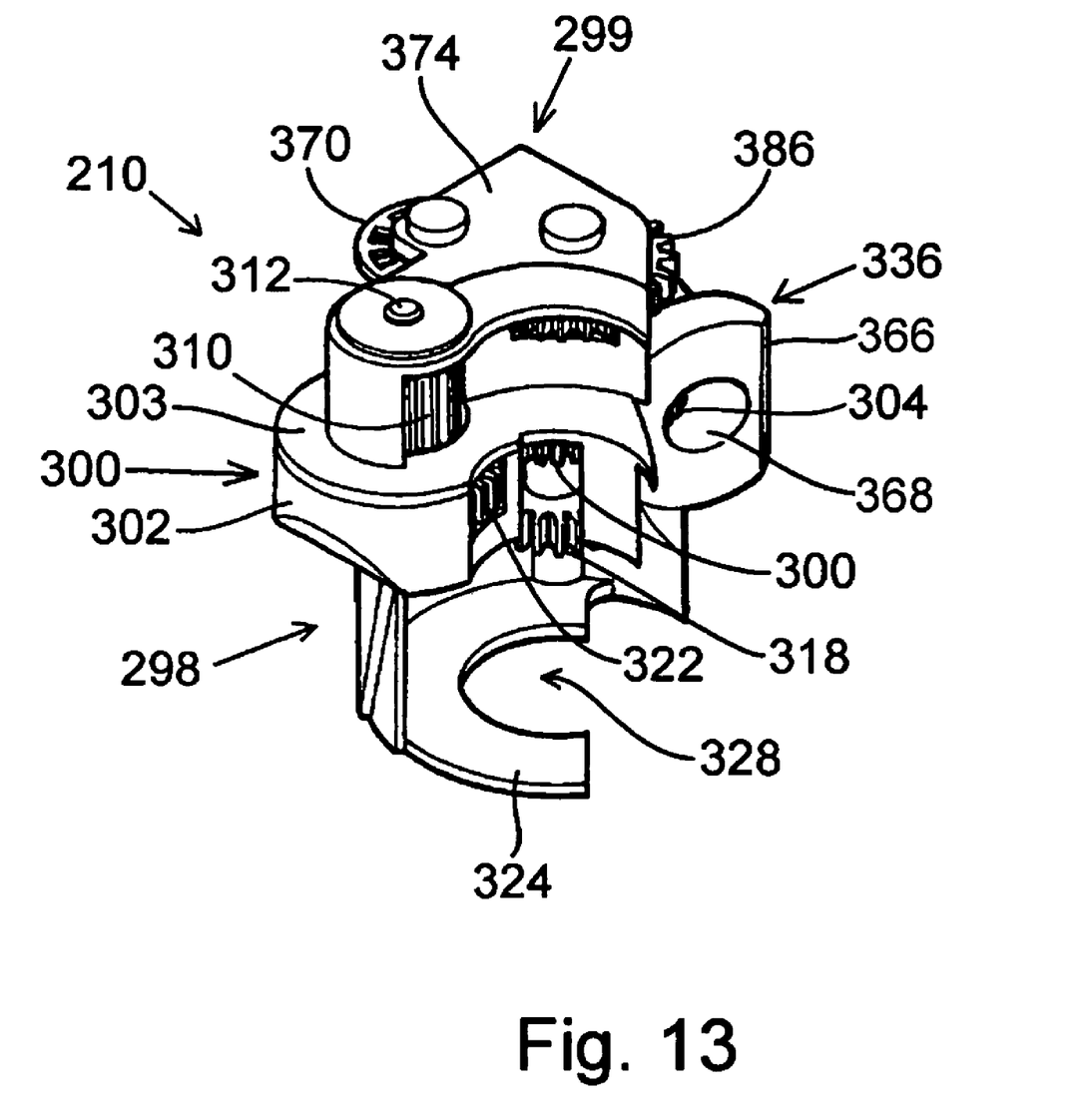
FIG. 13 is a view of the gear reduction mechanism removed from the base member.
Figure 14:
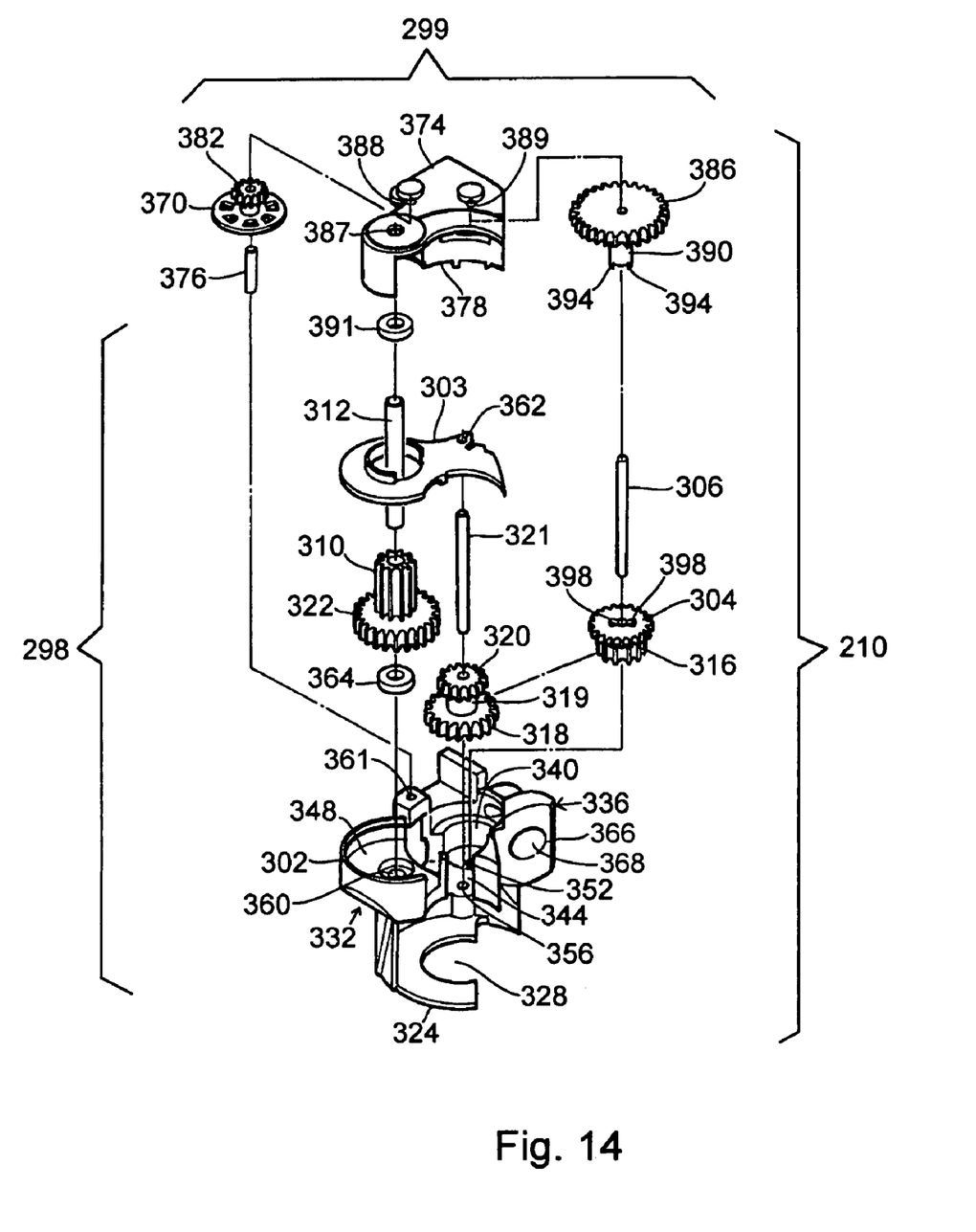
FIG. 14 is an exploded view of the gear reduction mechanism.

FIG. 13 is a view of gear reduction mechanism 210 removed from drive housing 174, and FIG. 14 is an exploded view of gear reduction mechanism 210. In this embodiment, gear reduction mechanism 210 is a self-contained unit that is housed within drive component space 202 of drive housing 174 such that gear reduction mechanism 210 is disposed entirely within base member 100 and can be removed as a unit from base member 100. As shown in FIGS. 13 and 14, gear reduction mechanism 210 comprises a gear support 300 that supports a gear reduction unit 298 and a position sensing unit 299. Gear reduction unit 298 comprises a main support 302 including a main support cover 303, both of which may be made of a plastic material, a first gear 304 rotatably coupled to main support 302 through a pivot shaft 306 for engaging motor shaft drive gear 230 so as to receive rotational drive force from motor 206; a second gear 310 rotatably coupled to main support 302 through a pivot shaft 312 for engaging a driven portion or component such as a link drive gear 314 (FIG. 9) that rotates integrally with third link pin 146 and second link member 124; and a plurality of intermediate gears 316, 318, 320 and 322 coupled between first gear 304 and second gear 310 for further reducing the rate of rotation between motor shaft drive gear 230 and link drive gear 314. Smaller diameter intermediate gear 316 is integrally formed with first gear 304 and engages larger diameter intermediate gear 318. Intermediate gear 318 is integrally formed with smaller diameter intermediate gear 320 and spaced apart there-from by a spacer 319, wherein intermediate gears 318 and 320 are rotatably coupled to main support 302 and main support cover 303 through a pivot shaft 321. Intermediate gear 320 engages larger diameter intermediate gear 322, wherein intermediate gear 322 is integrally formed with second gear 310.

Main support 302 includes a semicircular bottom portion 324 with an opening 328 for receiving third link pin 146 therethrough, a main body portion 332, a motor interface portion 336, and main support cover 303. Main body portion 332 includes a gear cavity 340 for housing first gear 304 and intermediate gear 316, a gear cavity 344 for housing intermediate gears 318 and 320, and a gear cavity 348 for housing intermediate gear 322. Gear cavity 340 includes a pivot shaft opening 352 for supporting a lower end of pivot shaft 306, gear cavity 344 includes a pivot shaft opening 356 for supporting a lower end of pivot shaft 321, and gear cavity 348 includes a pivot shaft opening 360 for supporting a lower end of pivot shaft 312. A pivot shaft opening 362 is formed in main support cover 303 supporting an upper end of pivot shaft 321. A bushing 364 is disposed in gear cavity 348 between intermediate gear 322 and main body portion 332 to stabilize intermediate gear 322. Motor interface portion 336 is provided for stably interfacing motor 206 with main support 302 and includes a drive shaft receiving member 366 with a drive shaft receiving opening 368 for receiving drive shaft 222 therethrough so that motor shaft drive gear 230 may engage first gear 304.

Position sensing unit 299 is operatively coupled to first gear 304, and it comprises an optical position sensing member 370 rotatably supported to a position sensing unit support 374 (which may be made of a plastic material) through a pivot shaft 376, a phototransmitter/photoreceiver unit 378 coupled to position sensing unit support 374, a smaller diameter position sensing reduction gear 382 that rotates integrally with position sensing member 370, and a larger diameter position sensing reduction gear 386 rotatably coupled to position sensing unit support 374 through pivot shaft 306. Position sensing unit support 374 includes a pivot shaft opening 387 for supporting an upper end of pivot shaft 312, a pivot shaft opening 388 for supporting an upper end of pivot shaft 376, and a pivot shaft opening 389 for supporting an upper end of pivot shaft 306. A bushing 391 is disposed between second gear 310 and position sensing unit support 374 to stabilize second gear 310. Position sensing reduction gear 386 includes a coupling shaft 390 with a pair of key projections 394 that engage a corresponding pair of key openings 398 in first gear 304 so that position sensing reduction gear 386 rotates integrally with first gear 304. As a result of position sensing reduction gears 382 and 386, position sensing member 370 also rotates integrally with first gear 304, but at a faster rate.

It should be readily apparent that main support 302 rotatably supports first gear 304, second gear 310 and the plurality of intermediate gears 316, 318, 320 and 322 as a substantially self-contained unit, and position sensing unit support 374 rotatably supports position sensing member 370, phototransmitter/photoreceiver unit 378 and position sensing reduction gears 382 and 386 as a substantially self-contained unit. As a result of this structure, gear reduction mechanism 210 may be removed from base member 100 as a unit for replacement or repair, and gear reduction unit 298 and position sensing unit 299 may be separated from each other as substantially self contained units for separate replacement or repair. Furthermore, forming gear support parts such as main support 302, main support cover 303 and position sensing unit support 374 from a plastic material reduce manufacturing costs and also reduces the noise from the operation of the gears.

While the above is a description of various embodiments of inventive features, further modifications may be employed without departing from the spirit and scope of the present invention. For example, the size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The invention claimed is:

1. A gear reduction apparatus for a bicycle component, wherein the apparatus comprises:
   a gear support;
   a first gear coupled to the gear support for receiving rotational drive force from a drive component;
   a second gear coupled to the gear support for communicating rotational drive force to a driven portion of the bicycle component;
   wherein the first gear is operatively coupled to the second gear to communicate rotational drive force from the drive component to the driven portion of the bicycle component; and
   wherein the first gear, the second gear and the gear support are coupled together so that the first gear, the second gear and the gear support so coupled together are structured be coupled to and removed from the drive component and the driven portion of the bicycle component as a self-contained unit.

2. The apparatus according to claim 1 further comprising a position sensing member operatively coupled to the gear support so as to receive rotational drive force from the drive component.

3. The apparatus according to claim 2 wherein the first gear, the second gear, the position sensing member and the gear support are coupled together so that the first gear, the second gear, the position sensing member and the gear support may be coupled to and removed from the drive component and the driven portion of the bicycle component as a self-contained unit.

4. The apparatus according to claim 3 wherein the position sensing member comprises an optical position sensing member.

5. The apparatus according to claim 3 wherein the position sensing member rotates integrally with the first gear.

6. The apparatus according to claim 5 further comprising a position sensing reduction gear operatively coupled between the first gear and the position sensing member to change a rotation rate between the first gear and the position sensing member.

7. The apparatus according to claim 6 wherein the gear support comprises:
   a main support that supports at least one of the first gear and the second gear; and
   a position sensing support that is detachably mounted to the main support, wherein the position sensing support supports the position sensing reduction gear so that the position sensing support and the position sensing reduction gear may be removed from the main support as a self-contained unit.

8. The apparatus according to claim 7 wherein the position sensing support supports the position sensing reduction gear and the position sensing member so that the position sensing support, the position sensing reduction gear and the position sensing member may be removed from the main support as a self-contained unit.

9. The apparatus according to claim 8 wherein the main support supports the first gear and the second gear.

10. The apparatus according to claim 1 wherein the drive component comprises an electric motor with a drive shaft for communicating rotational power to the first gear.

11. The apparatus according to claim 10 wherein the gear support includes a drive shaft receiving member for receiving the drive shaft.

12. The apparatus according to claim 11 wherein the drive shaft receiving member includes a drive shaft receiving opening for receiving the drive shaft therethrough.

13. The apparatus according to claim 1 wherein the bicycle electrical component comprises an electrical derailleur.

14. The apparatus according to claim 13 wherein the gear support is structured to mount to a base member of the derailleur.

15. The apparatus according to claim 14 wherein the driven portion comprises a link driving member that drives a link that couples the base member to a movable member supporting a chain guide.

16. The apparatus according to claim 15 wherein the link driving member comprises a link driving gear that engages the second gear.

17. The apparatus according to claim 16 wherein the gear support is structured to be mounted within the base member.

18. The apparatus according to claim 1 wherein the gear support is made of a plastic material.

19. The apparatus according to claim 1 wherein the gear support comprises a plurality of gear support parts.

20. The apparatus according to claim 19 wherein the plurality of gear support parts are made of a plastic material.

21. A gear reduction apparatus for a bicycle electrical component, wherein the apparatus comprises:
   a gear support;
   a first gear coupled to the gear support for receiving rotational drive force from a drive component;
   a second gear coupled to the gear support for engaging a driven portion of the bicycle component;
   wherein the first gear is operatively coupled to the second gear to communicate rotational drive force from the drive component to the driven portion of the bicycle component; and
   wherein the first gear and the second gear are supported in the gear support by plastic gear support parts.

* * * * *